US012746932B1

(12) United States Patent
Erickson et al.

(10) Patent No.: US 12,746,932 B1
(45) Date of Patent: Sep. 29, 2026

(54) TOKENIZED DELEGATION OF AUTHORITY FOR ASSET USAGE

(71) Applicant: United Services Automobile Association (USAA), San Antonio, TX (US)

(72) Inventors: Jennifer Hunt Erickson, San Antonio, TX (US); Jeanie Graciela Lopez, San Antonio, TX (US); Thomas Wayne Schwarz, Jr., Helotes, TX (US); Donald Nathaniel Holloway, III, San Antonio, TX (US); Sumita T. Jonak, San Antonio, TX (US); Mark Paxman Warnick, San Antonio, TX (US); Will Kerns Maney, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 300 days.

(21) Appl. No.: 17/875,905

(22) Filed: Jul. 28, 2022

Related U.S. Application Data

(60) Provisional application No. 63/227,953, filed on Jul. 30, 2021.

(51) Int. Cl.
*G06F 21/00* (2013.01)
*B60W 40/09* (2012.01)
*B60W 40/08* (2012.01)

(52) U.S. Cl.
CPC ............. *B60W 40/09* (2013.01); *G06F 21/00* (2013.01); *B60W 2040/0809* (2013.01); *B60W 2510/0638* (2013.01)

(58) Field of Classification Search
CPC .................. G06F 21/00; B60W 40/09; B60W 2040/0809; B60W 2510/0638
See application file for complete search history.

(56) References Cited

U.S. PATENT DOCUMENTS

| | | | | |
|---|---|---|---|---|
| 10,339,521 | B1 * | 7/2019 | Bodkin | G06Q 20/322 |
| 2002/0144142 | A1 * | 10/2002 | Shohat | G06F 21/6218 726/4 |

(Continued)

FOREIGN PATENT DOCUMENTS

| | | | | | |
|---|---|---|---|---|---|
| AU | 2014208184 | A1 * | 2/2015 | H04L 63/101 |
| CN | 101026481 | * | 9/2007 | |

OTHER PUBLICATIONS

Osborn et al., "Configuring Role-Based Access Control to Enforce Mandatory and Discretionary Access Control Policies", ACM Transactions on Information and System Security, vol. 3, No. 2, May 2000, pp. 85-106, (Year: 2000).*

(Continued)

*Primary Examiner* — Piotr Poltorak
(74) *Attorney, Agent, or Firm* — Ashurst Perkins Coie US LLP

(57) ABSTRACT

Systems and methods for delegating an asset are described herein. An asset management user interface is provided to an asset owner. The asset management user interface can include visual representations of one or more assets registered as owned by the asset owner. The asset owner can then select an asset to delegate with one or more usage rights. The usage rights can restrict some asset functions and allow a delegate to use other asset function, as defined by the usage rights. A delegation token can be created based on the usage rights and the delegate. The delegation token is then transferred to a device associated with the asset or the delegate, enabling the asset to be used, but that use limited according to the usage rights.

20 Claims, 10 Drawing Sheets

(56) References Cited

U.S. PATENT DOCUMENTS

| | | | | |
|---|---|---|---|---|
| 2013/0086389 | A1* | 4/2013 | Suwald | G06F 21/36<br>713/185 |
| 2016/0255086 | A1* | 9/2016 | Vajravelu | H04L 63/101<br>726/4 |
| 2017/0052522 | A1* | 2/2017 | Klein | H04L 67/34 |
| 2018/0154867 | A1* | 6/2018 | Golduber | G06Q 10/02 |
| 2020/0328891 | A1* | 10/2020 | Drouot | H04L 9/0637 |
| 2021/0174351 | A1* | 6/2021 | Wiklof | G06Q 50/184 |
| 2023/0047509 | A1* | 2/2023 | Dhodapkar | G06Q 20/24 |

OTHER PUBLICATIONS

Roeckle et al., "Process-Oriented Approach for Role-Finding to Implement Role-Based Security Administration in a Large Industrial Organization", RBAC 2000, Berlin, Germany © ACM 2000 1-58113-259-x/00/07, (Year: 2000).*

Schaad et al., "The Role-Based Access Control System of a European Bank: A Case Study and Discussion", SACMAT '01, May 3-4, 2001, Chantilly, Virginia, USA Copyright 2001 ACM 1-58113-350-2/01/0005 (Year: 2001).*

Shin et al., "A Role Administration System in Role-based Authorization Infrastructures—Design and Implementation" , 2003 ACM 1-58113-624-2/03/03 . . . $ (Year: 2003).*

* cited by examiner

TOKENIZED DELEGATION OF AUTHORITY FOR ASSET USAGE

CROSS-REFERENCE TO RELATED APPLICATION

This application is a non-provisional of and claims priority to U.S. Provisional Application No. 63/227,953, filed on Jul. 30, 2021, entitled "TOKENIZED DELEGATION OF AUTHORITY FOR ASSET USAGE," which is hereby incorporated by reference in its entirety for all purposes.

TECHNICAL FIELD

The present disclosure is directed to a tokenized delegation system for delegating and enforcing rights for asset use from an owner of the asset to a delegate.

BACKGROUND

The modern economy has seen a rise in "gig" employment, or temporary, short-term employment, such as independent contracting and project-based workers. Many modern companies rely on gig employees as a workforce. For example, some companies rely on gig employees to own housing units and rent out the housing units on a temporary basis. Other companies rely on the gig employees to own vehicles and rent out the service of those vehicles to others, such as ride-sharing or car rentals. These companies have little control over how the gig employees handle the assets the gig employees own and how users renting those assets utilize the assets.

Companies can also be involved in asset rental programs, which allow users to get contractual rights to assets for a limited time with little to no enforcement on how the user utilizes the asset. For example, some companies can rent vehicles by the mile or by the day to users, and the user pays by the mile, by the day, or both. Certain obligations can be written into the contract, such as the user paying for any damages to the asset, returning the asset at a specified time or in a specified state, and operating the asset in a specified manner. After the contract is signed, the company has little control over the use of the asset until it is returned, at which time the company determines if the user met the obligations set forth in the contract.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
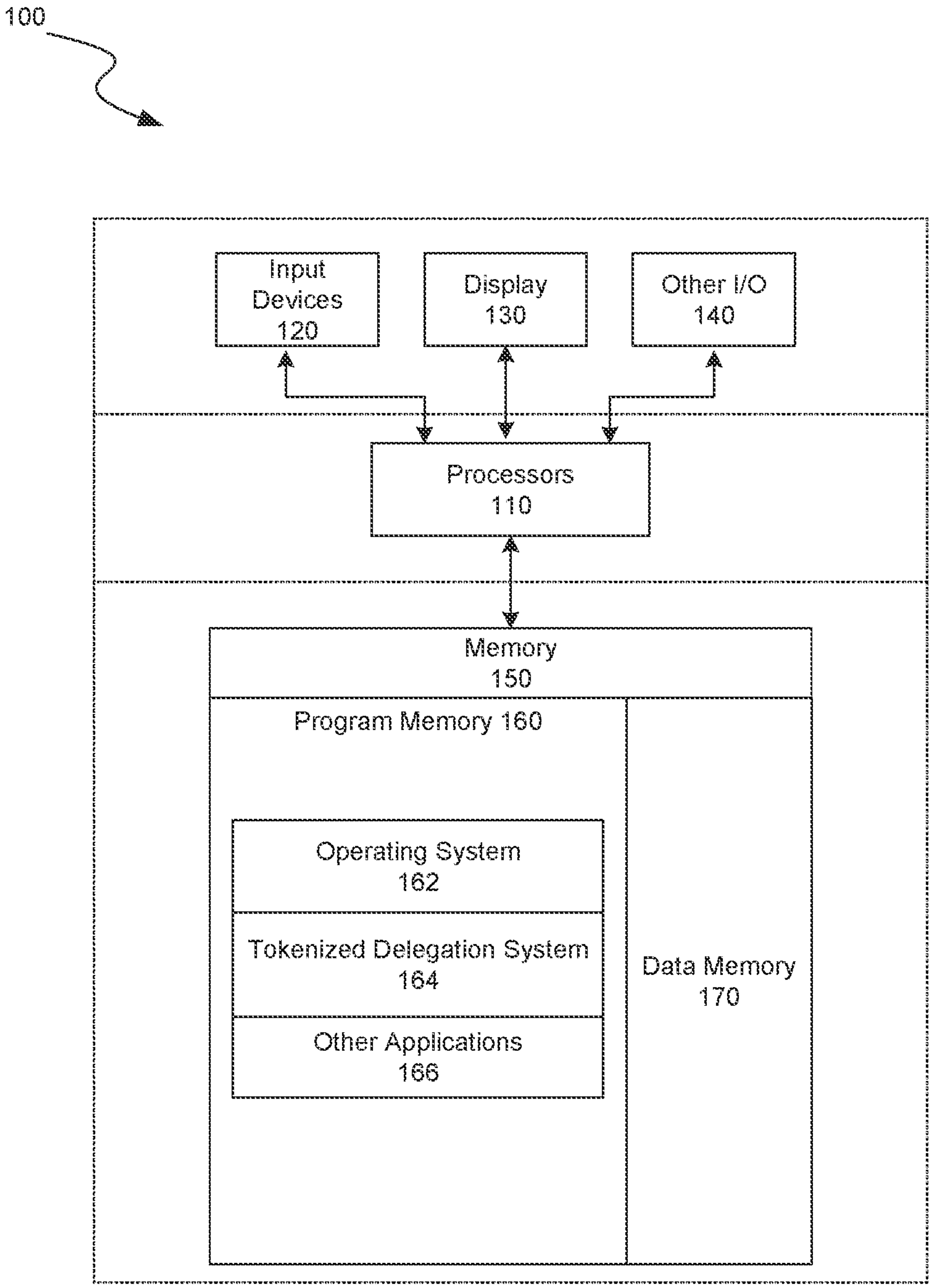
FIG. 1 is a block diagram illustrating an overview of devices on which some implementations can operate.

Aspects of the present disclosure are directed to a tokenized delegation system for delegating and enforcing rights for asset use from an owner of the asset to a delegate. A tokenized delegation system allows owners of assets, such as cars, living spaces, computing devices, data, or other physical or virtual items, to delegate access to those assets to other users, referred to herein as delegates. Asset owners can define what functionalities of the asset the delegate can access. For example, an asset owner can delegate use of a vehicle to a delegate. The asset owner can set access rights to the asset for the delegate, such as only allowing the delegate to drive below a certain speed threshold, drive for a certain amount of time or distance, drive within a geofenced area, or the like.

As used herein, the term "asset" refers to an entity, physical or virtual, that can be assigned, by an owner of the asset, in whole or in part, to another. An asset can be a vehicle, a living space (or portion thereof), a computing device, a physical item (such as an electrical appliance or article of clothing), data, a virtual object (e.g., an object that exists in a game or other application or in an artificial reality environment), or the like. The asset can have a representative data structure, which can include information about the asset, such as a name of the asset, a type of the asset (e.g., vehicle, mobile phone, etc.), capabilities of the asset, and access rights for the asset. Asset capabilities include various functions of the asset. For example, vehicles can have capabilities such controlling speed, controlling access to various vehicle compartments, controlling where the vehicle can drive, or the like. Access rights define what capabilities of the asset can be delegated and to what extent the capabilities can be accessed by a delegate. For example, an asset owner can limit how fast a delegate can drive a delegated vehicle, where the delegate can drive the delegated vehicle, what compartments of the vehicle the delegate can access, what data of the vehicle can be accessed, or the like.

Digital tokens are data objects used to identify to an asset and which access rights of the asset a delegate is assigned. Digital tokens facilitate real-world transactions and can be used to track various transactions between users. Digital tokens can be created in response to an initiation of a transaction between two parties, can be cryptographically generated, and can include information about the transaction as part of the token.

In some implementations, the tokenized delegation system provides an owner registration process for asset owners. For example, an asset owner, via a user interface, can define assets the owner may want to delegate. In some implementations, the asset owner first sets up and account, providing identification information, such as user name, password, personal information, identity verification information, and other information to the tokenized delegation system to create an asset owner user profile. Additional details regarding registering asset owners and creating user accounts can be found below in relation to FIG. 4.

After the asset owner profile is created (or in some cases without an owner profile), an asset owner can select assets the asset owner owns and can delegate to various delegates. For example, selected assets can include vehicles, living spaces, computing devices, data, and other delegable items, which can be physical or virtual. When an asset is selected, the tokenized delegation system can obtain a template for the asset with identifying information such as a name of the asset, a type of the asset, and various capabilities of the asset that are controllably delegable to delegates. In various implementations, the template can be supplied by a manufacturer or distributer of the asset, by the asset owner, an administrator of the tokenized delegation system, or by another entity. The tokenized delegation system can also set certain parameters regarding asset delegation, such as discoverability of the asset by potential delegates. After receiving the identifying information and asset delegation parameters, the tokenized delegation system can register the asset and link the asset to the asset owner or the asset owner profile. Additional details regarding linking an asset with an asset owner can be found below in relation to FIG. 5.

In some implementations, the tokenized delegation system provides a delegate registration interface to a delegate, e.g., on a personal computing device. The delegate can enter information into the registration interface, including information such as a delegate name, delegate contact information, delegate role, or the like. The tokenized delegation system receives the information associated with the delegate and creates a delegate user profile. Additional details regarding delegate user profiles can be found below in relation to FIG. 6.

In some implementations, the tokenized delegation system can present an asset management user interface, to the asset owner, through which the asset owner can delegate linked assets to various delegates. This can include the asset owner selecting rights/capabilities to assign to the delegate, such as an amount of time the delegate has access to the asset or what features of the asset the delegate can access. After the owner performs the delegation (selecting the asset, the delegate, and the delegated asset rights), the tokenized delegation system can create a delegation token, which includes information associated with the delegation of the asset to the delegate. The token is transferred to the delegate or to the asset, allowing the delegate to use the asset. Additional details regarding the delegation of assets and the creation of tokens are provided below in relation to FIG. 7.

In some implementations, the delegate can request an override of the rights assigned to the delegate. For example, the delegate can request an extension of time for delegation of the asset. The tokenized delegation system receives this override request and presents the override request to the asset owner in the asset management user interface on the personal computing device. The asset owner provides an input at the asset management user interface that allows or denies the request for the override. The tokenized delegation system then provides the input to the delegate. Additional details regarding overriding asset delegations are provided below in relation to blocks 716 and 718 of FIGS. 7 and 810-814 of FIG. 8.

In some implementations, the tokenized delegation system monitors an asset in use by a delegate by monitoring a token associated with the delegate and the asset. The tokenized delegation system monitors attempted asset actions and determines if the action is authorized under the delegation. If the actions being taken are outside the scope of the delegated rights of the asset, the tokenized delegation system can deny the action. The tokenized delegation system can also take interjectory actions, such as providing a message to the delegate that the delegate is operating the asset outside the allowed scope of delegated rights or providing a command to the asset to shut down or perform some other action to limit the delegate from using the asset outside the allowed scope of delegated rights. Additional details regarding the monitoring of delegate actions are provided below in relation to FIG. 8.

Individuals own assets that they may delegate to another user for a period of time. For example, an asset owner can own a vehicle that a valet service may park. In existing system, after giving the keys to the valet, the owner of the vehicle has little control over the vehicle while it is being operated by the valet and almost no insight into the location of the vehicle. In another example, an asset owner can own data, such as financial data, for a company. Auditing companies may need to access the data that the asset owner has control of, but the asset owner may wish to protect data not relevant to the audit from public viewing by the auditors. The tokenized delegation system uses digitally generated tokens to enable access to different capabilities of an asset to a delegate. The asset owner defines the capabilities the delegate can access and limitations on the capabilities. For example, if the asset is a vehicle, the asset owner can limit how fast the vehicle can be driven, how far the vehicle can be driven, what compartments the delegate (such as a valet) can access in the vehicle, how far away from the asset owner the vehicle is allowed to be taken, or the like. These limitations and capabilities are assigned in a digital token, which is then provided to the asset or to the delegate to access the asset. While the delegate is in possession of the asset, the tokenized delegation system tracks the usage of the asset to ensure the delegate is operating within the limitations defined by the asset owner. If any of the limitations are exceeded (such as driving a vehicle too fast or too far from the asset owner), the asset owner is notified and the tokenized delegation system can also take actions to prevent the unwanted behavior, such as throttling a vehicle back to a desired speed or notifying the delegate that the limitation is being exceeded.

By enabling an asset owner to create limits on the capabilities of an asset that a delegated user can access, the asset owner can ensure that assets can be delegated when it is needed or desired while being able to monitor and potentially control the behavior of the asset. This enables users to efficiently manage assets for delegation without needing to worry that delegates are improperly utilizing delegated assets.

Several implementations are discussed below in more detail in reference to the figures. FIG. 1 is a block diagram illustrating an overview of devices on which some implementations of the disclosed technology can operate. The devices can comprise hardware components of a device 100 that can create, manage, and delegate tokens for accessing assets owned by an asset owner. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, tokenized delegation system 164, and other application programs 166. Memory 150 can also include data memory 170, e.g., data for creating and delegating tokens for asset management, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
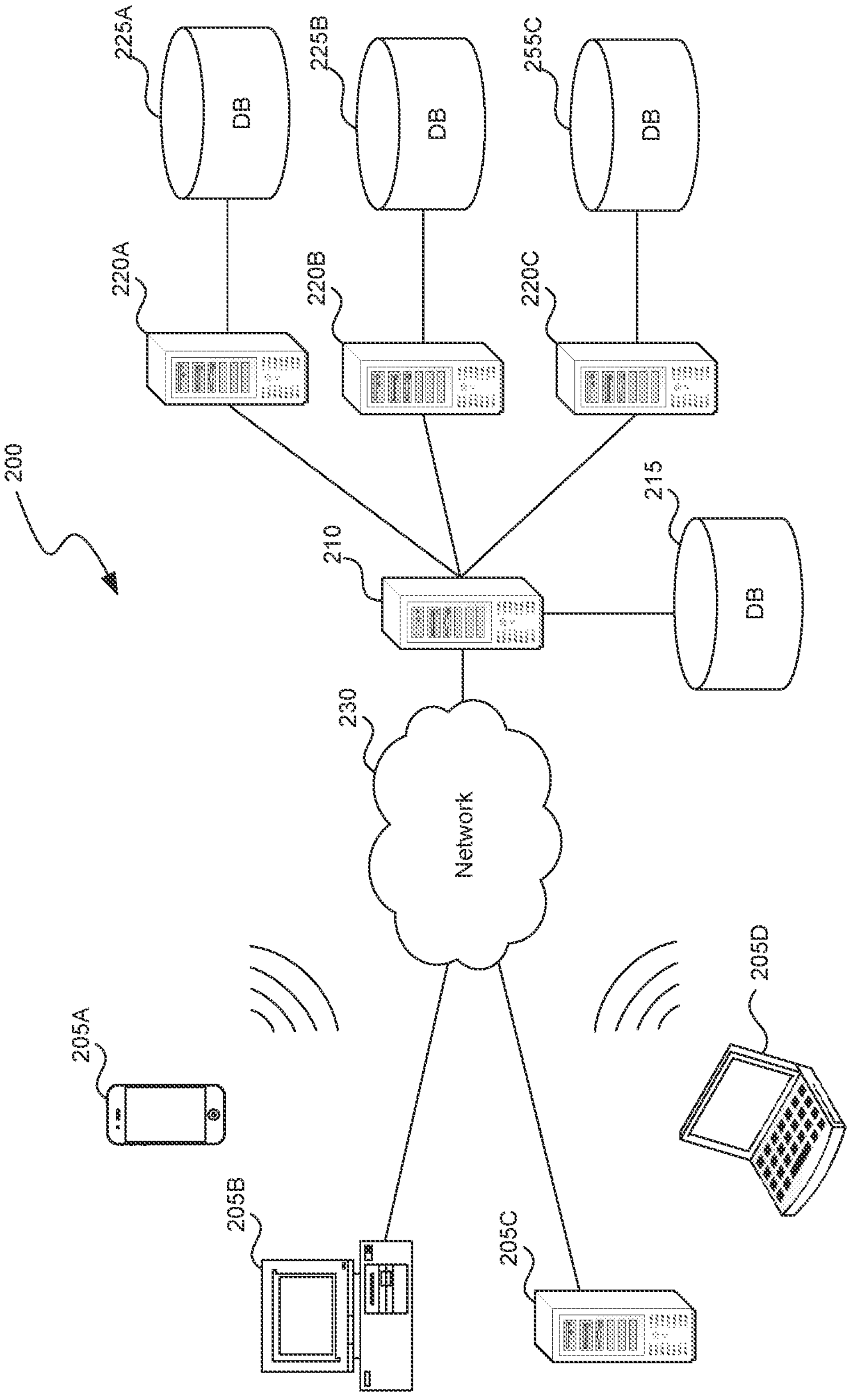
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as data for creating and delegating tokens for asset management. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
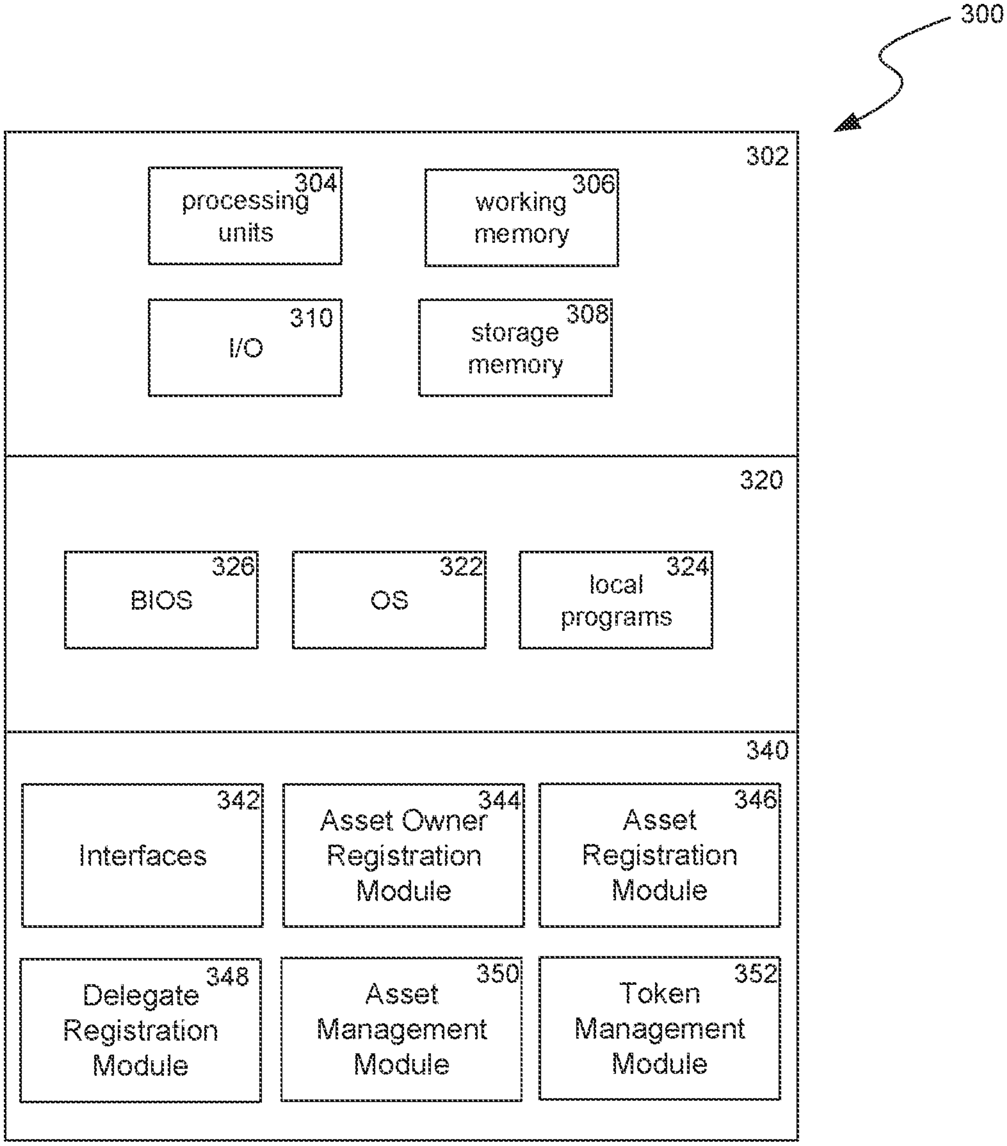
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an asset owner registration module 344, an asset registration module 346, a delegate registration module 348, an asset delegation module 350, a token management module 352, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Asset owner registration module 344 receives asset owner identification information and creates an asset owner user profile. The asset owner user profile identifies the asset owner and allows an asset owner to link a list of assets owned by the asset owner and a list of approved delegates for delegating the assets. The asset owner user profile can also include financial information and banking information to allow the asset owner to receive payments from delegates to "rent" out assets from the asset owner. Additional details regarding asset owner registration can be found below in relation to blocks 404 and 406 of FIG. 4.

Asset registration module 346 receives asset information and creates assets to associate with asset owners. For example, the asset registration module 346 can receive an identifier of the asset, capabilities of the asset, what capabilities of the asset can be delegated, default rights and capabilities of the asset that can be delegated, a price for renting the asset from the asset owner, or the like. The asset registration module can then create associations between the asset and the asset owner, such as creating a link between the asset and the asset owner. Additional details regarding registering assets with asset owners can be found below in relation to block 506 of FIG. 5.

Delegate registration module 348 receives delegate identification information and creates a delegate user profile for delegates of assets. Delegate information can include a delegate name, delegate role, organization the delegate is associated with, and financial information or banking information for the delegate to use to "rent" assets from asset owners. Additional details regarding delegate user profiles can be found below in relation to block 604 of FIG. 6.

Asset delegation module 350 allows asset owners to delegate use of assets associated with the asset owners to delegates. The asset owner can define a set of capabilities of the asset that the delegate can access and different rights to different capabilities. For example, the asset owner can restrict the delegate from accessing certain behaviors or data of an asset, allow the delegate to access specific compartments or spaces of an asset, set limits on how a capability of an asset can be used, or the like. The asset delegation module allows delegates to sub-delegate use of the asset to other delegates. Sub-delegation can involve delegating only a specific subset of the rights delegated to the original delegate to the sub-delegate. The asset delegation module 350 can also handle any requests delegates may have concerning overriding existing rights and adding access to new capabilities of the asset. Additional details regarding asset delegation can be found below in relation to blocks 706, 708, and 710 of FIG. 7.

Token management module 352 can create and manage digital tokens. The digital tokens are generated in response to an asset being delegated from an asset owner to a delegate. The tokens are encrypted and include information related to the asset, the asset owner, the delegate, and the capabilities of the asset delegated to the delegate. The token is generated and then provided to the delegate or the asset, which allows the delegate to operate the asset within the defined rights in the token. The token can also track a chain of transfer of the asset, such as tracking which delegates the asset has been delegated to, if the delegates have sub-delegated the asset, or the like. Additional details regarding the creation and management of the digital tokens can be found below in relation to blocks 712 and 714 of FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
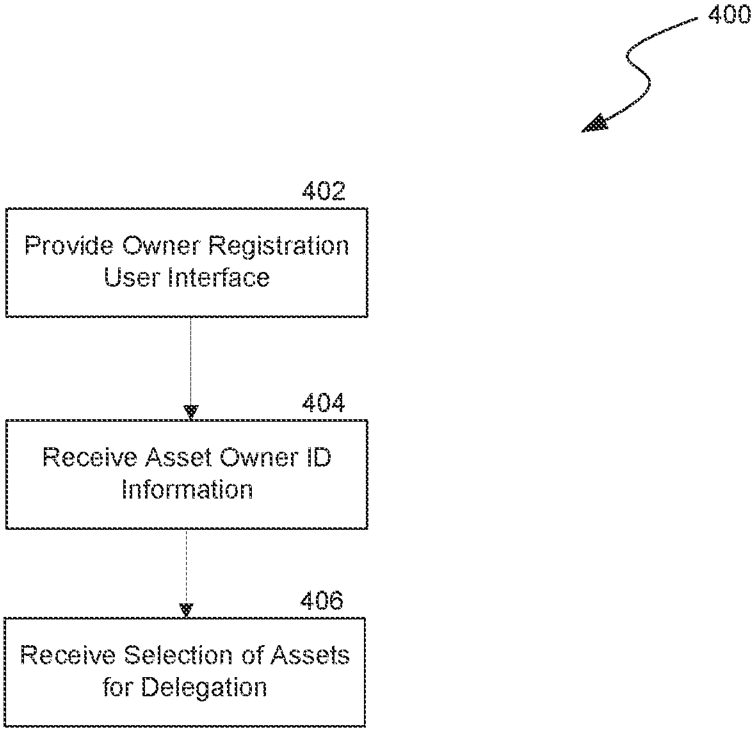
FIG. 4 is a flow diagram illustrating a process used in some implementations for registering an asset owner in a tokenized delegation system.

FIG. 4 is a flow diagram illustrating a process 400 used in some implementations for registering an asset owner in a tokenized delegation system. In some implementations, process 400 can be performed in response to an asset owner initiating asset owner registration, such as by selecting a link on a web page or selecting a registration element of a user interface presented in a software application. In some implementations, process 400 can be performed by one or more servers of the tokenized delegation system.

At block 402, process 400 provides an owner registration user interface. The owner registration user interface can be presented to an asset owner via a web interface on a web page or as a user interface in an asset sharing software application. The owner registration user interface can include fields for entering asset owner identifying information, asset identification information, or the like.

At block 404, process 400 receives asset owner identity information. Asset owner identity information can include a name of the asset owner, a preferred username or handle of the asset owner for use with an asset delegation software application, a password, an address of the asset owner, an email address or other electronic contact information for messaging the asset owner, or the like. Values for the asset owner identity information are provided by the asset owner using the owner registration user interface.

In some implementations, the asset owner can provide proof of identification, such as providing an image of a driver's license, an image of a state-issued identification card, an image of a passport, an image of a voter registration card, or an image of a different photo identification. In other implementations, the asset owner can provide other proof of identification, such as an image of a piece of mail addressed to the asset owner. In other implementations, a third-party authentication service can verify the identity of the asset owner.

In some implementations, the asset owner can specify a list of potential delegates for asset usage to link to the asset owner's user account. Potential delegates can include individuals, groups of individuals, companies, or the like. In one example, the asset owner can allow process 400 to access to a list of contacts, such as contacts stored by the asset owner on a social media network, in an address book, contacts for a smart phone, or the like. The list of contacts can be identified using a single sign-on with another service, such as a social media platform.

The asset owner can also provide default asset delegation parameters for identified potential delegates. For example, the asset owner can define a standard duration of delegation of an asset, whether a delegate can sub-delegate assets to other delegates, whether the delegate can request additional rights when using the asset, how a delegate is notified of the delegation of the asset, how a delegate is notified that the asset is being used outside the specified rights of the asset, or the like. These default asset delegation parameters can be for specific delegates from the list of delegates linked to the asset owner's account or can be global asset delegation default settings for all assets the asset owner owns.

At block 406, process 400 receives a selection of assets for delegation to link with the asset owner's user account. The assets for delegations can be any number of assets of various asset types, such as physical or virtual assets. For example, the assets for delegation can be vehicles owned by the asset owner, living spaces or portions of living spaces owned by the asset owner, computing devices owned by the asset owner, data items and information owned by the asset owner, software applications owned by the asset owner, and other physical or virtual assets. In some implementations, the tokenized delegation system can be specialized for a particular type of assets, such as only for vehicles.

In some implementations, the account owner can be asked for proof of asset ownership before the asset is linked to the account owner's user account. Proof of asset ownership can be a car registration or vehicle identification number, a proof of purchase of an item such as a receipt, a title or deed to an item, a contract signed by the asset owner entitling the asset owner to ownership, a software licensing agreement, a unique software application code or key, a public or private key, or the like. In some implementations, in addition to the asset owner providing proof of ownership, the asset owner can also be asked for a license to operate the asset. For example, if the asset is a vehicle, the asset owner can be asked for an image of a valid driver's license. In another example, if the asset is a living space or a portion of a living space, the asset owner can asked for an image of a permit that allows the asset owner to rent the living space or portion of the living space to another individual.

In some implementations, the asset owner can also link a payment method to the user account. In addition to being able to freely delegate assets associated with the asset owner, the asset owner can also rent out assets in exchange for payment from delegates. Asset owners receive the payments, which are processed by the payment method, and funds associated with the transactions are added to a financial account, such as a savings account or checking account, associated with the asset owners.

Figure 5:
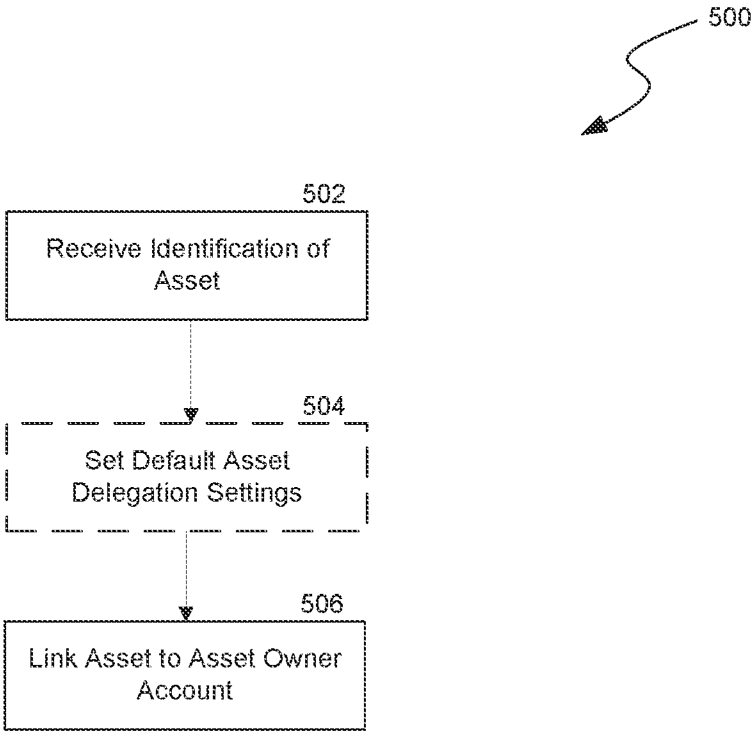
FIG. 5 is a flow diagram illustrating a process used in some implementations for registering an asset in a tokenized delegation system.

FIG. 5 is a flow diagram illustrating a process 500 used in some implementations for registering an asset in a tokenized delegation system. In some implementations, process 500 can be performed in response to an asset owner selecting a "Register New Asset" element on a user interface provided in a web page or software application. In other implementations, process 500 can be performed in response to an asset owner selecting assets to associate with the user account of the asset owner, such as an asset owner selecting assets as described above in relation to block 406 of FIG. 4.

At block 502, process 500 receives an identification of an asset from a user. In some implementations, the user can select an asset template from a database of asset templates to define the asset. Each asset template can specify asset features such as asset name, asset category (e.g., vehicle, living space, computing device, software application, etc.), and asset capabilities. Asset capabilities can be features of an asset that can be controlled when the asset is delegated to a delegate. For example, if the asset is a vehicle, the asset capabilities can include a maximum driving speed, areas in which the vehicle is allowed to operate, a maximum distance the vehicle is allowed to drive, the ability to read data from an onboard vehicle computer, the ability to access a compartment in the vehicle, or the like. In another example, if the asset is a computing device, the asset capabilities can include rights to access various data, rights to access various data storage locations, rights to execute functions, rights to operate in an administrator mode, rights to use of peripherals, rights to access various networks, or the like.

Asset templates can be defined by a creator, manufacturer, or distributer of the asset or by various users. In some implementations, a standard set of templates can be available for asset registration and the user registering an asset can also have the ability to create custom templates for assets. For example, a user can define a new asset template and associated asset fields and capabilities, such as asset name, asset type, asset functionality, or the like. The user can put custom limitations on the usage of the asset by delegates. Asset templates can be selected or created via a user interface. Users can utilize the user interface to select asset templates, search asset templates, or create new asset templates.

At block 504, process 500 can set default asset delegation settings. As mentioned above, any blocks can be omitted or rearranged. However, block 504 is shown in broken lines to call out a specific instance where block 504 can be skipped. Default asset delegation settings can include whether an asset is discoverable in a searchable marketplace, how an asset is discoverable in a searchable marketplace, rules for requesting delegation of the asset, a price to pay in exchange for delegation of the asset for an agreed-upon period of time, or the like. Default asset delegation settings can also include whether an asset linked to the asset owner's user account can appear in searches in the marketplace as available to rent. In some implementations, a delegate role can allow delegates to view assets that are not globally searchable on the marketplace. For example, if the delegate has a "valet" role or "driver for Company A," the delegate can find vehicles on the marketplace to rent, while a general delegate account will not be able to find vehicles to rent.

At block 506, process 500 links the newly created asset to the asset owner's user account. The asset is associated with the asset owner and is now selectable and viewable in an asset owner user interface. As shown in process 700 described below, the asset owner can select the asset and delegate the asset, change aspects of the asset, change settings associated with the asset, change asset capabilities or modify existing capability settings, or the like. After the asset is linked to the asset owner's user account, the asset owner can delegate the asset to delegates and, optionally, receive rental payments from delegates for the delegation of the asset.

Figure 6:
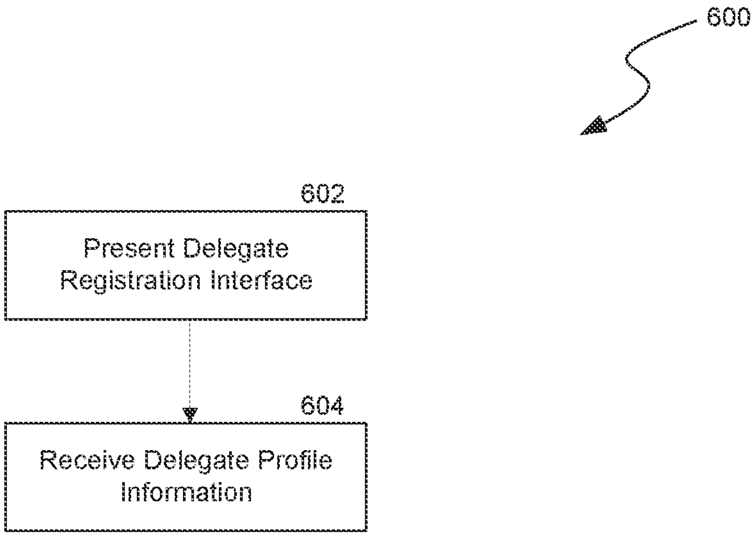
FIG. 6 is a flow diagram illustrating a process used in some implementations for registering a delegate in a tokenized delegation system.

FIG. 6 is a flow diagram illustrating a process 600 used in some implementations for registering a delegate in a tokenized delegation system. In some implementations, process 600 can be performed in response to a delegate selecting an element on a user interface presented on a web page or in a software application to create a delegate profile.

At block 602, process 600 provides a delegate registration user interface to the delegate on the web page or in the software application. The delegate registration user interface can include fields where the delegate can enter information related to the account being created.

At block 604, process 600 receives the entered delegate profile information from the delegate registration user interface. The delegate profile information can include a name of the delegate, an address of the delegate, a user name or handle of the delegate, a password for the delegate account, an email address or other means for contacting the delegate, or the like. In some implementations, the delegate profile information can include a delegate role. The delegate role defines a specific function for the delegate. For example, the delegate role can be "IT Administrator," "Valet," "Contract Driver," "Software Developer," and other rules. Specific assets for delegation can require the delegate to have a specific delegate role to search the asset, view the asset, request delegation of the asset, or have the asset be delegated to the delegate. For example, a delegate can be required to have an "IT Administrator" or "Software Developer" role to have access to specific software applications be delegated to them. In another example, the delegate can be required to have a "Valet" or "Contract Driver" role to search, view, and request delegation of vehicle assets.

In some implementations, the delegate profile information can include a delegate employer, company, or organization. For some assets, delegates can be required to be associated with a particular employer, company, or organization to search, view, request delegation, and be delegated certain assets. For example, if the delegate is to be delegated a vehicle, the delegate can be required to be associated with a valet service, a ride-share service, a taxi service, a shipping service, or the like. In another example, if the delegate is to be delegated a particular integrated development environment for writing software code, the delegate can be required to be associated with a software development company, an information technology, or the like.

In some implementations, the delegate can be required to provide proof of identity and/or rights. For example, the delegate can be required to provide a driver's license to both provide proof of identity and that the delegate is a licensed driver. Certain assets can require these proofs of identity and/or rights. For example, if the delegate is a valet or a driver for a company, the delegate can be required to have a valid driver's license. In another example, if the delegate is to be delegated a living space, the delegate can be required to submit proof of renter's insurance or proof of income to rent a particular living space.

In some implementations, the delegate can also provide financial information, such as a bank account, credit card, debit card, or the like. The financial information is linked to the delegate profile and allows the delegate to spend money in return for delegation of rights to particular assets. For example, the delegate can "rent" and asset, such as a living space, in return for a payment to the owner of the asset.

After the delegate information is received, the delegate profile is created, and the delegate is free to search a marketplace for particular assets for delegation.

Figure 7:
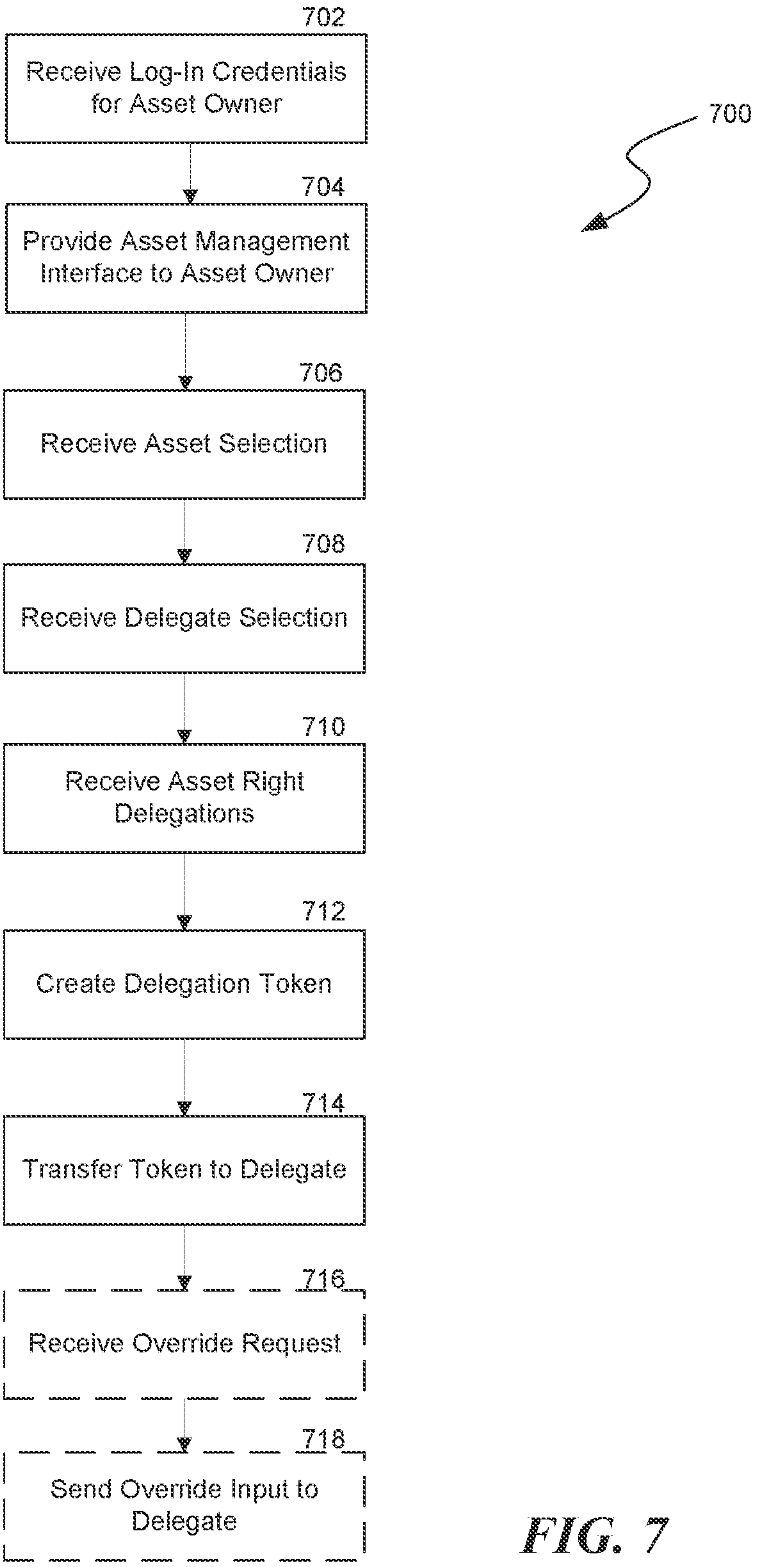
FIG. 7 is a flow diagram illustrating a process used in some implementations for assigning a digital token with asset usage rights from an owner to a delegate.

FIG. 7 is a flow diagram illustrating a process 700 used in some implementations for assigning a digital token with asset usage rights from an owner to a delegate. In some implementations, process 700 can be executed in response to an asset owner logging into to an asset management software application, an asset management web site, or the like. In other implementations, process 700 can be executed in response to a request from a delegate for delegation of an asset.

At block 702, process 700 receives log-in credentials from an asset owner. The log-in credentials can be received from a web page interface, a user interface in a software application on a mobile phone, tablet, or computer, an in-car display, a smart television, or the like. The log-in credentials can include a user name or handle, a name of the asset owner, a password, an email address, a token stored from a previous login, or the like. In some implementations, the asset owner can be required to use two-factor authentication to access the asset owner account. For example, in addition to providing a user name and password, the asset owner can be required to answer a security question, enter a code from a two-factor authentication software application, or the like.

At block 704, process 700 provides an asset management user interface to the asset owner. In various implementations, the asset management user interface can allow an asset owner to view assets associated with the asset owner, view delegates for delegation of assets, view a currently selected asset, search a marketplace for other assets, or the like. The currently selected asset can include displaying the asset name, the delegation rights and options for the asset, and can include a control for delegating the asset to the delegate. In some implementations, the asset management user interface can be displayed within the software application or web page, but data within the asset management user interface is populated from a central data repository. An example of an asset management user interface is discussed below in relation to FIG. 9.

At block 706, process 700 receives a selection of an asset linked to the asset owner's account. In some implementations, the asset owner can select the asset from the displayed list of assets for delegation in the asset management user interface. In other implementations, the asset owner can search for the asset and select the asset from the results of the search.

At block 708, process 700 receives a selection of a delegate for the asset. In some implementations, the asset owner can select the delegate from a list of delegates linked to the asset owner's account and displayed in the asset management user interface, a delegate from a list of contacts, commonly selected delegates, or the like. In other implementations, the asset owner can search for registered delegates and/or organizations in the marketplace. The asset owner can search by delegate name, delegate role, delegate employer, delegate company, delegate organization, organization type, organization area of expertise, or the like.

In some implementations, the asset owner can select a delegate based on a near-field communication or global positioning system signal associated with the delegate. For example, a device associated with the asset owner can use near field communication to identify and communicate with a device associated with the delegate. In another example, a device associated with the delegate can report its position to a central system that provides the location of delegate devices to the asset owner. In some implementations, the provided delegate devices are only shown to an asset owner (e.g., on a "map" user interface) if the delegate devices are within a threshold distance of the device of the asset owner.

In some implementations, instead of selecting a specific delegate, the asset owner can select a "generic delegate," which is used as a proxy delegate for a generated token (as discussed below in relation to block 712) instead of selecting a particular delegate. For example, a generic delegate can be assigned a token, which is then assigned to an asset, such as a vehicle, for a particular window of time. The generic delegate can be stored in a memory of the vehicle. Anyone with access to the vehicle can access the rights given to the generic delegate while within the window of time, regardless of who the person using the vehicle is. In some implementations, the generic delegate can be created and assigned to an asset, and the user of the asset can then create a delegate profile (as discussed above with regards to FIG. 6) "on the fly," or when the delegate first accesses the asset.

At block 710, process 700 receives a selection of one or more asset right delegations from the asset owner. In some implementations, each asset can have a set of default rights to be delegated to the delegate when the asset is selected. For example, if the asset is a vehicle, the asset can include rights such as "access to glove compartment," "drive at any speed not exceeding 80 miles per hour," "drive within a 5 mile radius of the location of a device associated with the asset owner at the time of delegation," "access on-board computer," or the like. These default asset rights for delegation can be the same rights set for the asset in step 504 of FIG. 5.

The asset owner can modify the default rights, restrict some of the default rights, and add additional rights for delegation. For example, the asset owner can restrict the delegate from accessing the on-board computer of a vehicle, set an area where the delegate can drive the vehicle, add in a right for the delegate to access the trunk of the vehicle, etc. The asset owner can also specify additional delegation parameters for the delegated rights. For example, the asset owner can provide a window of time for when the delegate has access to the asset and any associated rights, provide a right to the delegate to sub-delegate use of the asset and any rights sub-delegates can access for the asset, whether delegated rights can be overridden, how delegated rights can be overridden, or the like.

At block 712, process 700 creates a token associated with the asset, asset owner, and delegate (if a delegate is selected). The token is a digital token, that can be encrypted, which defines the rights the delegate can use, and allows the delegate to access the asset. The token can include an identifier of the asset, an identifier of the asset owner, and an identifier of the delegate. In some implementations, the token can be just a reference, such as a uniform resource indicator/locator (URI/URL), that is resolved when the token is used. This allows updates to the delegation of the access after the token is generated.

The token can include a chain of transfer that specifies who is currently in possession of the token and, therefore, who can currently access certain rights of the asset. For example, the token can indicate that the asset owner has delegated certain rights to the delegate, who in turn delegated one of those rights to a sub-delegate. The token maintains this chain of ownership of the token by tracking the sending and receiving of the token to various devices associated with users, such as the transfer between the asset owner and the delegate. In another example, the token can be delegated to an organization, which then delegates the token to an employee of the organization for handling the asset. The token tracks this sub-delegation to the employee when the token is transferred from the organization to the employee.

At block 714, process 700 transfer the token to the selected delegate. In some implementations, the token is transferred from a device of the asset owner to a device of the delegate and stored in a token management software application on the device associated with the delegate. While the delegate is in possession of the token, the user can access all delegated rights of the asset. In other implementations, the token is provided to the asset and is accessible by the delegate when the delegate logs in to access the asset, such as when the delegate logs in to an account on a computing device or enters credentials in a car display system. In these implementations, the token can be instilled in the asset even if no specific delegate is chosen or the delegate is not in the central system. This allows anyone with access to the asset to use the and any delegated rights of the asset. In some cases, transfer of the token can be performed via a blockchain implementation where a distributed log tracks token allocations.

In some implementation, the token can be stored on a mobile storage device, such as a flash drive, portable hard drive, radio frequency tag, or the like. In these implementations, the delegate that is given the mobile storage device can use the mobile storage device to access the asset and the delegated rights of the asset. For example, if the mobile storage device is a flash drive, the delegate can plug the flash drive into a port of the asset to access the asset. In another example, if the mobile storage device is a radio frequency tag, the delegate only needs to possess the mobile storage device near the asset, which then contacts the mobile storage device to access the token. In some implementations, in addition to having the token be stored on the mobile storage device, the delegate can also be required to enter a personal identification number or other credentials to use.

At block 716, process 700 can receive an override request from the delegate using the asset. As mentioned above, any blocks can be omitted or rearranged. However, block 716 is shown in broken lines to call out a specific instance where block 716 can be skipped. An override request occurs when the delegate using the asset wishes to use one of the asset capabilities of the asset beyond what the delegate has rights to use. For example, if the asset is a vehicle, a delegate can request access to a glove compartment to retrieve an ice scraper even if the delegate does not have access to the glove compartment. A notification is sent to the asset owner that the delegate wishes to access one of the capabilities of the asset that the delegate does not currently have a right to use. The notification can include an identifier of the asset, an identifier of the asset capability, and a reason for why the delegate wishes to access the capability. The notification can be displayed to the asset owner in the asset owner user interface. The displayed notification can include controls for the asset owner to confirm or deny the override. If the asset owner confirms the override, the delegate is granted access to the asset capability. If the asset owner denies the override, the delegate is denied access to the asset capability. The override request is especially useful in emergency situations, such as driving in severe weather or if the delegate is pulled over for improper operation of the vehicle. In some implementations, override requests (or certain categories of override request-such as those specifying an emergency situation) are automatically approved and a notification of the override is provided to the asset owner.

At block 718, process 700 can determine if the asset owner selects confirm or deny (an "override input") and then sends the override input back to the delegate and/or the asset. As mentioned above, any blocks can be omitted or rearranged. However, block 716 is shown in broken lines to call out a specific instance where block 716 can be skipped. In some implementations, the override input notifies the delegate of the asset owner's decision. The asset owner can optionally provide a reason as to why the confirmation or denial was chosen.

Figure 8:
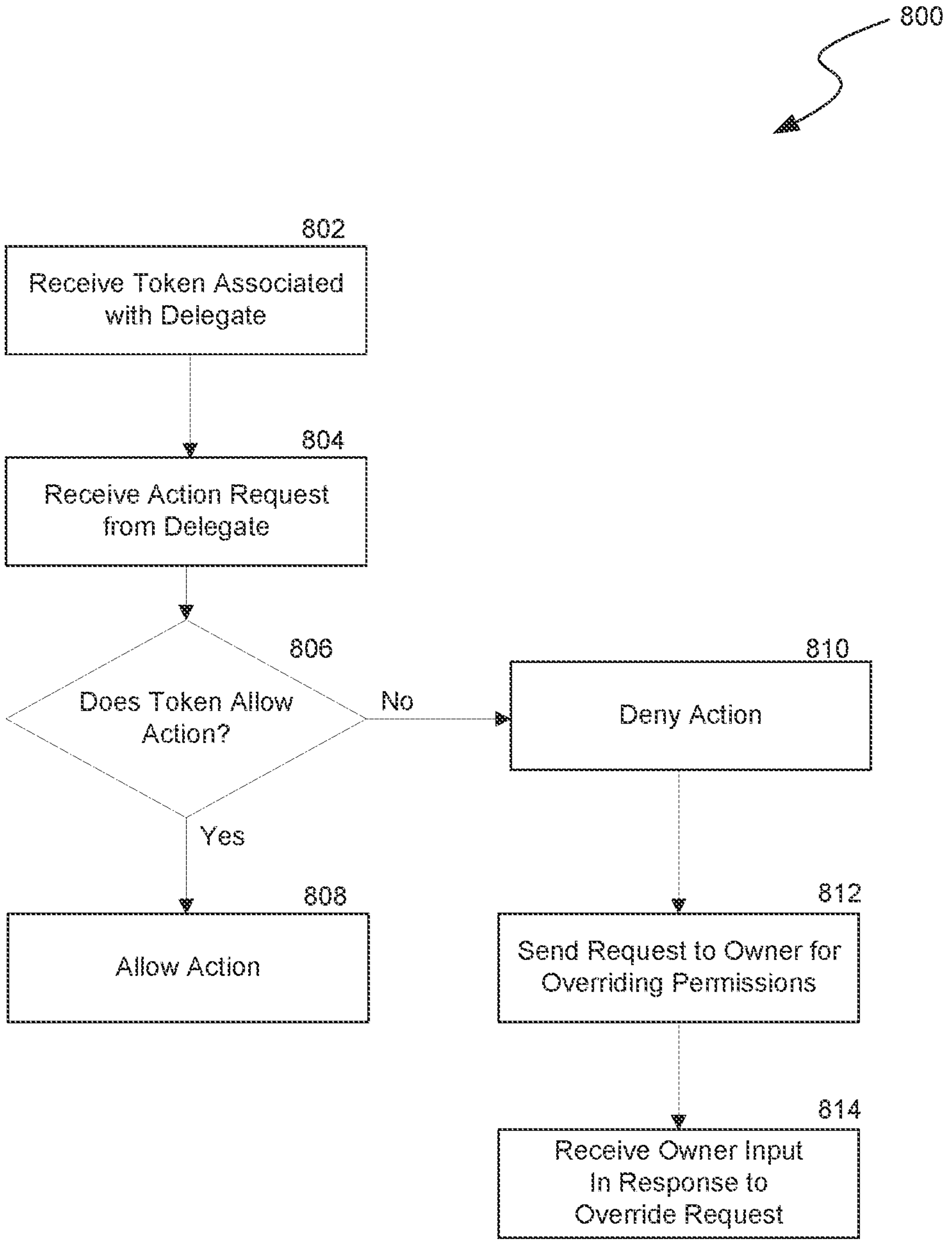
FIG. 8 is a flow diagram illustrating a process used in some implementations for an asset to restrict actions according to rights defined in a delegated token.

FIG. 8 is a flow diagram illustrating a process 800 used in some implementations for an asset to restrict actions according to rights defined in a delegated token. In some implementations, process 800 is executed in response to an event associated with the asset occurring. In other implementations, process 800 is executed upon the generation of the token and runs "in the background" until a triggering event occurs.

At block 802, process 800 receives a delegated token. In some implementations, the token is received in response to an asset owner providing an indication to the asset that it has been delegated. For example, in the asset management user interface, the asset owner can select an asset and put the asset into a delegation mode before the delegate takes control of the asset. In other implementations, the token is received from the delegate, e.g., by the delegate interfacing one of her computing devices with the asset, such as through a flash drive, wireless enabled dongle, or mobile device of the delegate providing the token to a vehicle. In yet further implementations, the asset can retrieve the token in response to the delegate providing an indication of the delegate's profile. For example, the delegate can sign into the asset, such as through a vehicle onboard display or a delegation app of a computing system; and once signed in, the asset can retrieve a token for that asset assigned to that delegate.

At block 804, process 800 receives an action request from the delegate. The action request can be an action that the asset can perform that the current token is in control of. Event listeners can be setup on the asset to monitor for actions that the token is in control of. For example, if the asset is a vehicle, the action request can be a request to unlock a door of the vehicle, open a compartment of the vehicle, operate the vehicle in a particular manner, operate computing devices within the vehicle, access data associated with the vehicle, or the like, depending on which actions the delegated token controls. In some implementations, the action request is received in response to an event occurring, such as receiving the request to open a compartment of the vehicle. In other implementations, an ongoing process detects asset actions, such as monitoring a speed of a vehicle and a distance driven by the vehicle.

At block 806, process 800 determines if the current token allows the action associated with the action request. For example, the action request can be to access a compartment of a vehicle. Process 800 checks the token to determine if the delegate has the right to access that compartment. If the token indicates that the delegate has the right to access the compartment ("Yes" at block 506), the delegate is allowed to perform the action (at block 808). Similar checks can be performed for other delegable actions, such as checking a vehicle speed, driving distance, driving area, etc.

If the token does not allow the user to access the capability ("No" at block 806), process 800 denies the action request (at block 810). In some implementations, when the action request is denied, no further action is taken. For example, if the delegate requests access to a compartment of the vehicle, the compartment stays locked and the delegate is not allowed to access the compartment. In other implementations, the action request can require that counter-actions be taken. For example, if the delegate begins to drive a vehicle above a maximum speed allowed by the vehicle, a command can be generated and sent to an onboard computer of the vehicle to take actions to slow the vehicle down to the allowed speed. For example, the delegate can be notified via audio that the maximum speed has been exceeded and that braking or coasting will begin. The vehicle is then gradually slowed to the allowed speed without interfering with the safety of the driver.

In some implementations, if the action is denied, the delegate can request an override of the rights delegated to the delegate. At block 812, process 800 generates and sends a request to the asset owner to override the delegated rights. Much like block 716 of FIG. 7, an override request occurs when the delegate using the asset wishes to use one of the asset capabilities of the asset beyond what the delegate has rights to use. For example, if the asset is a vehicle, a delegate can request access to a glove compartment to retrieve an ice scraper even if the delegate does not have access to the glove compartment. A notification is sent to the asset owner that the delegate wishes to access one of the capabilities of the asset that the delegate does not currently have a right to use. The notification can include an identifier of the asset, an identifier of the asset capability, and a reason for why the delegate wishes to access the capability. The notification can be displayed to the asset owner in the asset owner user interface. The displayed notification can include controls for the asset owner to confirm or deny the override. If the asset owner confirms the override, the delegate is granted access to the asset capability. If the asset owner denies the override, the delegate is denied access to the asset capability.

At block 814, process 800 can determine if the asset owner selects confirm or deny and then sends the override input back to the delegate and/or the asset. In some implementations, the override input notifies the delegate of the asset owner's decision. The asset owner can optionally provide a reason as to why the confirmation or denial was chosen. In some implementations, blocks 810-814 can be replaced with a step that automatically allows the override, but supplies the asset owner a notice of the override. For example, if a vehicle asset has been delegated and the delegate experiences an emergency and needs to go to a hospital outside the geofenced driving area, the vehicle may allow the geofence to be overridden solely on request of the delegate, but provides a notification to the asset owner that the asset was used outside the delegated usage rights. In some implementations, such automatic overrides can only be provided for a specified set of overridable rights. For example, the overridable rights can be those determined to affect safety of using a vehicle such as controlling vehicle speed or driving area, while overrides for other rights, such as accessing certain compartments, have to be approved by the asset owner.

Figure 9:
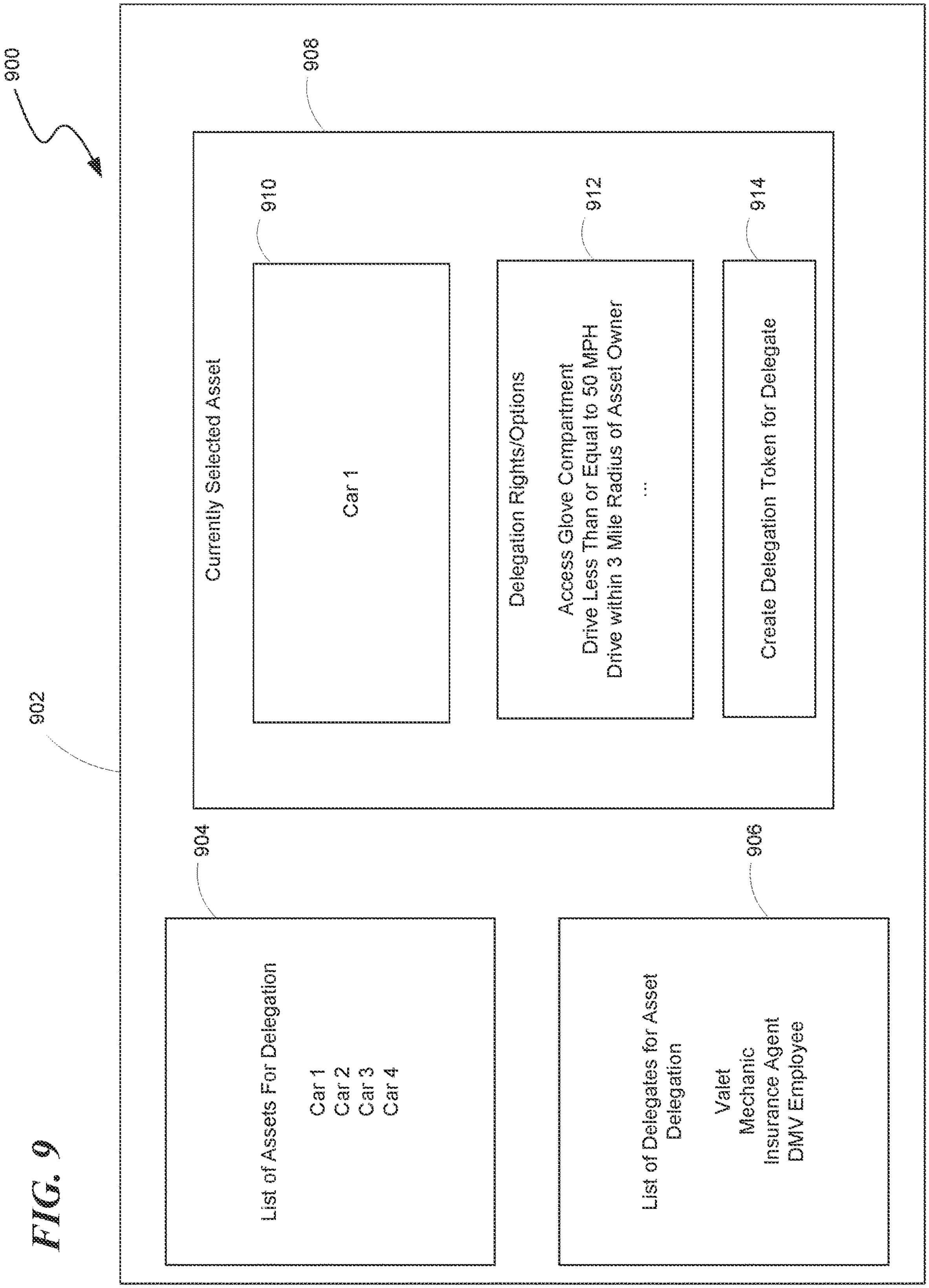
FIG. 9 is a conceptual diagram illustrating an example user interface for an asset owner.

FIG. 9 is a conceptual diagram illustrating an example 900 of a user interface 902 for an asset owner. The user interface 902 can include a list 904 of assets 904 for delegation, a list of delegates 906 to delegate assets to, and a currently selected asset 908. The list of assets 904 can include all assets linked to the account of the asset owner, who can select assets from the list to view details on a currently selected asset in the currently selected asset 908 window. In some implementations, the asset owner can search the list of assets for a particular asset and select an asset to view more details about the asset in the currently selected asset 908 window. These details can include an asset name 910, current rights/capabilities 912 of an asset for delegation, and a control 914 for creating a token and delegating the asset to a delegate. The delegate can be selected from the list of delegates 906, and the asset owner can select delegates to see information about each. In some implementations, the owner can search the list of delegates 906 for a particular delegate or use the list of delegates 906 to find delegates with particular characteristics (e.g., employees of a particular company or with a particular role) or in a particular area (e.g., delegates within 5 meters of the asset owner).

Figure 10:
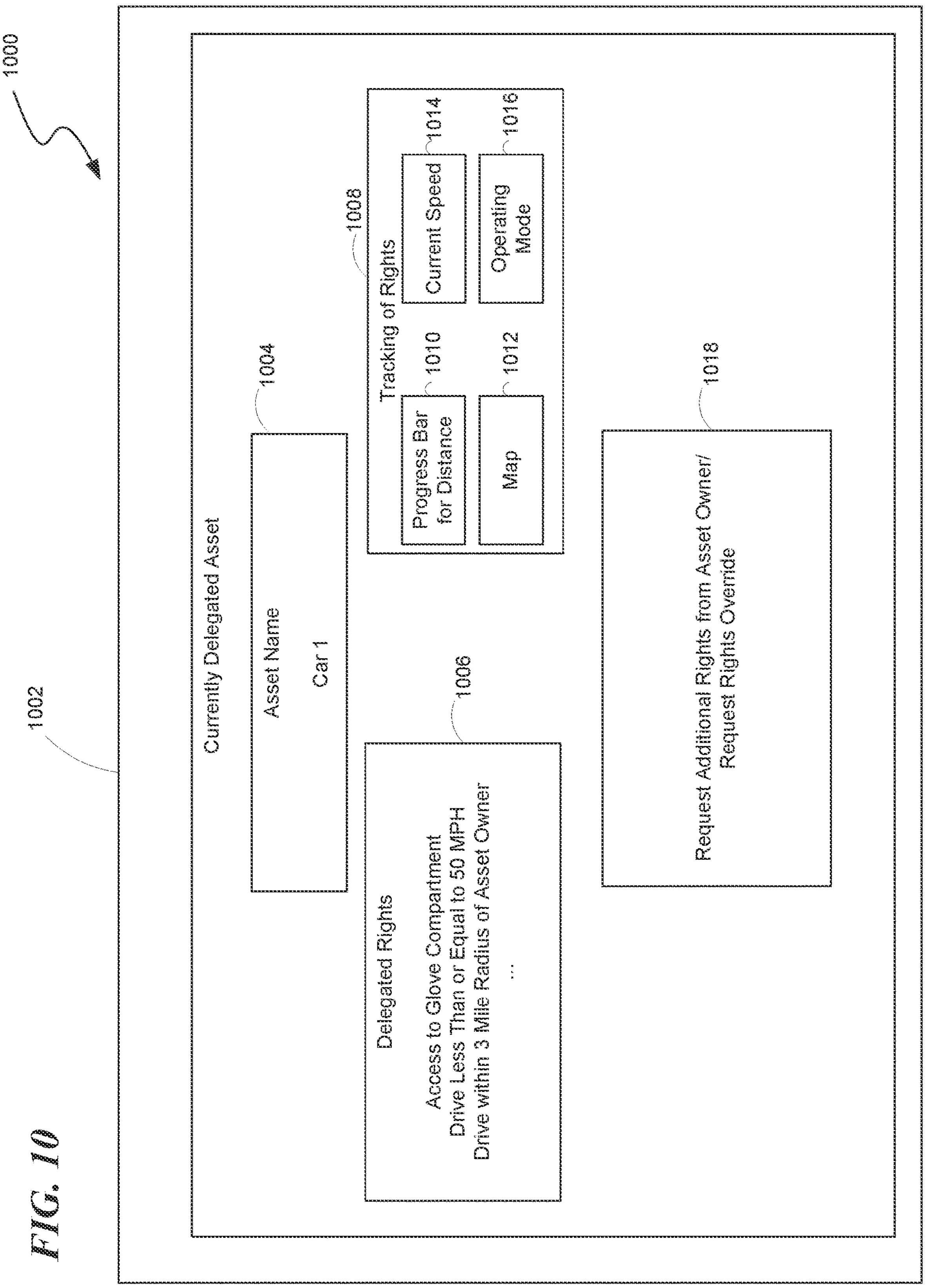
FIG. 10 is a conceptual diagram illustrating an example user interface for an asset delegate.

FIG. 10 is a conceptual diagram illustrating an example 1000 of a user interface 1002 for an asset delegate. The user interface 1002 can be displayed on a smartphone, a personal computing device, an on-board vehicle display, or the like. The user interface 1002 can include an asset name 1004, a list of delegated rights 1006 associated with the asset, which outlines the capabilities of the asset the delegate has access to and the limits of those capabilities. The user interface 1002 can also include a tracking of rights 1008, which lets the delegate track data associated with usage of the asset in comparison to the delegated rights. For example, a progress bar 1010 can track a distance the delegate has driven a vehicle and compare it with a maximum amount of distance the delegate is allowed drive. A map 1012 can illustrate a position of the vehicle relative delineating an area in which the vehicle can be driven (e.g., a geofenced area, a radius around the asset owner's device, an area around a location at which the delegation was made, etc.). A current speed 1014 can be displayed and compared to a maximum speed at which the delegate is allowed to operate the vehicle. An operating mode 1016 can also be displayed. For example, if the vehicle is a sports car, the vehicle can include a sports mode, which among other things increases acceleration response. The delegate can be restricted to only operating the vehicle in a normal mode and not the sports mode.

The user interface 1002 can also include a control 1018 to request extra rights or override existing rights from the asset owner. As described above with regards to block 716 of FIG. 7 and block 812 of FIG. 8, the delegate can request additional rights or override of existing rights, such as requesting to access a vehicle compartment or drive beyond the maximum allowed distance.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for delegating an asset, the method comprising:

providing an asset management user interface to an asset owner, the asset management user interface including visual representations of one or more assets registered as owned by the asset owner;

receiving, via the asset management user interface, a user input from the asset owner, the user input indicating a delegation of an asset of the one or more assets, wherein the delegation defines one or more usage rights of the asset and a delegate role required to access the asset;

receiving, via the asset management user interface, a selection of a delegate for the asset based on a global positioning system signal associated with a device, and a role of the delegate matching the delegate role, wherein the device is associated with at least one of the asset or the delegate;

creating a delegation token designating: the asset, the delegate, and the delegation of the one or more usage rights of the asset;

transferring the delegation token to the device associated with the asset and/or associated with the delegate, wherein the asset automatically restricts at least one asset function based on the one or more usage rights designated in the transferred delegation token;

in response to an attempt to perform the at least one asset function or the delegate requesting permission for the at least one asset function, receiving a request for the delegate to have access to the at least one asset function of the asset; and transmitting a command to the device associated with the asset and/or associated with the delegate to provide user access to the at least one asset function of the asset.

2. The method of claim 1, wherein:

the delegation token is transferred to a user device associated with the delegate, the asset management user interface provides a list of delegates associated with the asset owner, and user input indicates a selection of the delegate from the list of delegates.

3. The method of claim 1, the method further comprising:

detecting one or more delegate devices using a communication network, wherein the asset management user interface presents the one or more detected delegate devices to the asset owner;

wherein the received user input indicates the delegate via a selection of a delegate device, associated with the delegate, from the one more detected delegate devices presented in the asset management user interface; and wherein the transferring the delegation token transfers the delegation token to the selected delegate device.

4. The method of claim 1, wherein the one or more usage rights define a time frame in which the asset is to be delegated.

5. The method of claim 1, wherein the delegation token includes a chain of transfer of the delegation token, the chain of transfer specifying a delegate currently in possession of the delegation token and one or more previous delegates of the delegation token including a previous delegate who granted the delegation token to the delegate currently in possession of the delegation token.

6. The method of claim 5, wherein:

the one or more usage rights include transfer rights defining how the delegation token is transferrable to a second delegate, wherein the delegate transfers the delegation token to the second delegate in accordance with the transfer rights, and following the transfers the delegation token to the second delegate, the chain of transfer includes data indicating that the second delegate is currently in possession of the delegation token and that the second delegate received the delegation token from the delegate.

7. The method of claim 1, the method further comprising:

providing an override request to the asset owner;

receiving an override input from the asset owner; and transmitting the override input to the device associated with the asset and/or associated with the delegate, wherein the override input causes the delegation token to allow an otherwise restricted asset function.

8. A non-transitory computer-readable medium storing instructions that, when executed by one or more processors, cause the one or more processors to perform a process for delegating an asset, the process comprising:

providing an asset management user interface to an asset owner, the asset management user interface including visual representations of one or more assets registered as owned by the asset owner;

receiving, via the asset management user interface, a user input from the asset owner, the user input indicating a delegation of an asset of the one or more assets, wherein the delegation defines one or more usage rights of the asset and a delegate role required to access the asset;

receiving, via the asset management user interface, a selection of a delegate for the asset based on a global positioning system signal associated with a device, a role of the delegate matching the delegate role, wherein the device is associated with at least one of the asset or the delegate;

creating a delegation token designating: the asset, the delegate, and the delegation of the one or more usage rights of the asset;

transferring the delegation token to the device associated with the asset and/or associated with the delegate, wherein the asset automatically restricts at least one asset function based on the one or more usage rights designated in the transferred delegation token;

in response to an attempt to perform the at least one asset function or the delegate requesting permission for the at least one asset function, receiving a request for the delegate to have access to the at least one asset function of the asset; and transmitting a command to the device associated with the asset and/or associated with the delegate to provide user access to the at least one asset function of the asset.

9. The non-transitory computer-readable medium of claim 8, wherein the visual representations of the one or more assets are included in the asset management user interface based on a pre-registration of the one or more assets as owned by the asset owner.

10. The non-transitory computer-readable medium of claim 8, wherein the one or more usage rights of the asset include one or more default asset usage rights defined during a registration of the asset as owned by the asset owner.

11. The non-transitory computer-readable medium of claim 8, wherein the asset management user interface includes a set of one or more functions of the asset that can be restricted in delegation of the asset, wherein the set of one or more functions are specified by a digital template provided by a manufacturer of the asset, and wherein the one or more usage rights are selected, in the asset management user interface, based on the set of one or more functions.

12. The non-transitory computer-readable medium of claim 8, wherein the process further comprises:

prior to the providing the asset management user interface, receiving instructions to link the delegate to a user account of the asset owner, wherein the instructions include default delegation parameters specified for the delegate in relation to the user account;

wherein the one or more usage rights are defined based on the default delegation parameters.

13. The non-transitory computer-readable medium of claim 12, wherein:

the asset is a vehicle, and the one or more usage rights define two or more of: a maximum speed at which the delegate can operate the vehicle, a maximum total distance the delegate can operate the vehicle, a maximum distance from a device of the asset owner in which the delegate can operate the vehicle, a defined driving area, or access to a compartment of the vehicle.

14. The non-transitory computer-readable medium of claim 8, wherein the delegation token includes a reference, the reference being resolved upon end of use of the delegation token by the delegate, wherein the reference being resolved enables a new delegation of the asset by the asset owner.

15. A computing system for delegating an asset, the computing system comprising:

one or more processors; and one or more memories storing instructions that, when executed by the one or more processors, cause the computing system to perform a process comprising:

providing an asset management user interface to an asset owner, the asset management user interface including visual representations of one or more assets registered as owned by the asset owner;

receiving, via the asset management user interface, a user input from the asset owner, the user input indicating a delegation of an asset of the one or more assets, wherein the delegation defines one or more usage rights of the asset and a delegate role required to access the asset;

receiving, via the asset management user interface, a selection of a delegate for the asset based on a global positioning system signal associated with a device, and a role of the delegate matching the delegate role, wherein the device is associated with at least one of the asset or the delegate;

creating a delegation token designating: the asset, the delegate, and the delegation of the one or more usage rights of the asset;

transferring the delegation token to the device associated with the asset and/or associated with the delegate, wherein the asset automatically restricts at least one asset function based on the one or more usage rights designated in the transferred delegation token;

in response to an attempt to perform the at least one asset function or the delegate requesting permission for the at least one asset function, receiving a request for the delegate to have access to the at least one asset function of the asset; and transmitting a command to the device associated with the asset and/or associated with the delegate to provide user access to the at least one asset function of the asset.

16. The computing system of claim 15, wherein:

the asset management user interface provides a list of delegates associated with the asset owner, user input indicates a selection of the delegate from the list of delegates, and the delegation token is transferred to a user device associated with the delegate.

17. The computing system of claim 15, the process further comprising:

detecting one or more delegate devices using a communication network, wherein the asset management user interface presents visual indications associated with the one or more detected delegate devices to the asset owner;

wherein the received user input indicates the delegate via a selection of one of the visual indications presented in the asset management user interface; and wherein the transferring the delegation token transfers the delegation token to a delegate device corresponding to the selection.

18. The computing system of claim 15, wherein:

the delegate is a first delegate who further transferred the delegation token to a second delegate, and the delegation token includes a chain of transfer of the delegation token, the chain of transfer specifying:

the second delegate as currently in possession of the delegation token, and one or more previous delegates of the delegation token, including the first delegate.

19. The computing system of claim 18, wherein:

the one or more usage rights include transfer rights defining how the delegation token is transferrable to other delegates, wherein the transfer of the delegation token from the first delegate to the second delegate was in accordance with the transfer rights; and following the transfers the delegation token to the second delegate, the chain of transfer indicates that the second delegate received the delegation token from the delegate.

20. The computing system of claim 15, wherein the process further comprises:

providing an override request to the asset owner;

receiving an override input from the asset owner approving the override; and transmitting approval of the override to the device associated with the asset and/or associated with the delegate, wherein the override input causes the delegation token to allow an otherwise restricted asset function.

* * * * *